July 20, 1965     H. D. CORWIN     3,195,422
CYLINDER CONSTRUCTION
Filed Sept. 4, 1962
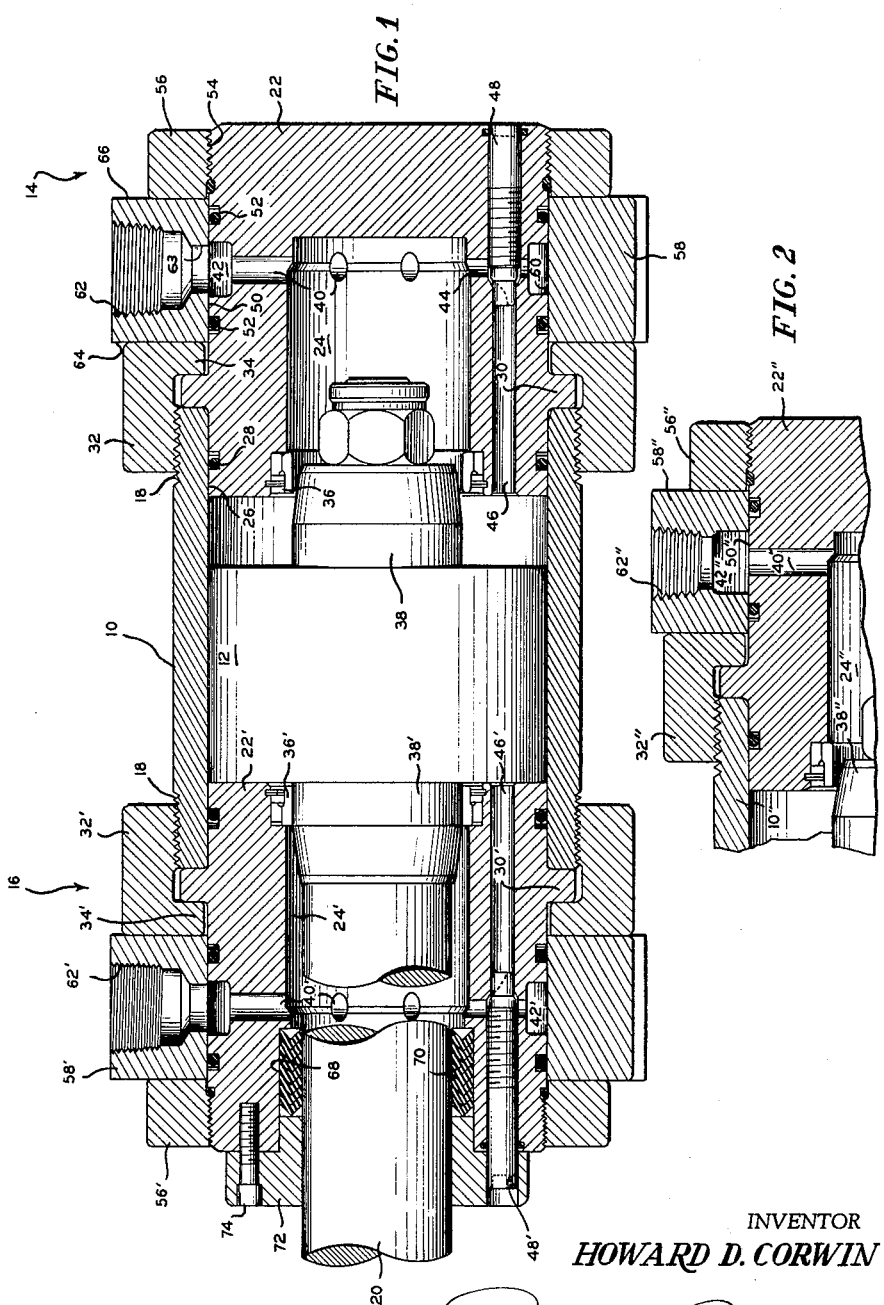
INVENTOR
*HOWARD D. CORWIN*
BY *Beaman & Beaman*
ATTORNEY

United States Patent Office 3,195,422
Patented July 20, 1965

3,195,422
CYLINDER CONSTRUCTION
Howard D. Corwin, Jackson, Mich., assignor to Tomkins-Johnson Company, Jackson, Mich., a corporation of Michigan
Filed Sept. 4, 1962, Ser. No. 221,093
5 Claims. (Cl. 92—164)

The invention pertains to an expansible motor construction and particularly relates to expansible motors employing cylinders enclosed at the end by ported head members.

Expansible motors employing cylinder and piston components are often employed in relatively confined quarters wherein the motors are positioned immediately adjacent a machine or other structure and only limited access to the motor is available. One of the problems encountered when installing expansible motors in confined locations arises from the necessity of properly locating the ports associated with the motor relative to the accessible area which is available. The ports often require maintenance in that the conduits associated therewith need periodic replacement and inspection to determine if leaks exist. Thus, it is desirable to provide cylinder structure wherein the ports are angularly adjustable relative to the cylinder body itself and the motor mounting brackets, whereby a flexibility and versatility of cylinder usage is produced which is not available with motors wherein the port is fixed with regard to the motor cylinder, as is the usual case. One type of versatile cylinder and head arrangement wherein a high degree of port location flexibility is produced is illustrated in my United States Patent No. 3,038,-448. The present invention is particularly adaptable with expansible motors of a larger size than the motors which employ the apparatus of the above-mentioned patent.

It is, therefore, an object of the invention to provide an expansible motor construction which is particularly adaptable for large size motors wherein the ports through which the pressure medium is introduced into the motor may be angularly adjusted through 360° relative to the cylinder structure, and the heads enclosing the cylinder.

Another object of the invention is to provide an expansible motor head wherein adjustable port means are provided relative to the head and high volume pressure medium flow characteristics through the head to the port are produced.

These and other objects of the invention arising from the details of the components and the relationships therebetween will be apparent from the following description and accompanying drawings wherein:

FIG. 1 is an elevational sectional view of an expansible motor employing cylinder heads in accord with the invention, and FIG. 2 is a detail view of a head and collar variation of the inventive concept.

FIG. 1 illustrates an expansible motor of the type in which the invention would be employed. The expansible motor includes a tubular cylindrical cylinder element 10 in which a piston 12 reciprocates. Conventional sealing means may be interposed between the piston and cylinder to prevent the flow of the pressurized medium past the piston. The cylinder is initially open at each end and is closed by means of heads 14 and 16 sealingly affixed to the ends. In the large size cylinders, to which the invention is particularly adapted, although not limited, the cylinder 10 is preferably threaded at the ends as at 18, whereby the head structure is attached to the cylinder by means of the threads. In FIG. 1 a very short cylinder 10 is illustrated, for purposes of illustration, and it will be understood that usually the ratio between the cylinder axial length and the axial length of the piston will be much greater than that shown.

The heads 14 and 16 are basically the same, employing the same inventive concept, and the variations in the structure thereof are due to the fact that the piston rod 20 of the piston 12 extends through the head 16. Thus, an opening and associated sealing means are necessary in the head 16 for the accommodation of the piston rod 20. In describing the invention, the right cylinder head 14 will be described and similar components in the head 16 are indicated by primes.

The head 14 includes a body portion 22 of a general cylindrical configuration, and is provided with an internal concentric chamber 24 which is in communication with the interior of the cylinder 10. The head 14 is also provided with a cylindrical surface 26 which is closely received within the cylinder 10 and is sealed thereto by an O-ring seal 28. A radially extending annular shoulder 30 is formed upon the body 22 for an abutting engagement with the end of the cylinder 10. An internally threaded ring 32, having a radially extending flange 34 adapted to engage the side of the shoulder 30 remote from the cylinder 10, is employed to attach the head 14 to the end of the cylinder. The threads of the ring 32 mate with threads 18 of the cylinder and maintain the shoulder 30 in firm engagement with the cylinder end.

The chamber 24 may be provided with cushioning valve structure 36 for cooperation with a valve element 38 mounted upon the piston 12. The cushioning valve structure 36 and the valve 38 form no part of the present invention, and may be of the type shown in United States Patent No. 2,804,052.

The body 22 is preferably provided with a plurality of radially extending openings or passages 40 which pass through the body, establishing communication between the chamber 24 and an annular groove or recess 42 defined about the periphery of the body 22. Passages 44 and 46 are also defined in the head, establishing communication between the interior of the cylinder adjacent the head and the chamber 24 and recess 42 through a regulating throttle bleed valve 48, for purposes of regulating the velocity of the piston after the cushioning action has occurred. The operation of the throttle valve 48 will be apparent from United States Patent No. 2,804,052.

The body 22 is provided with an exterior cylindrical surface at 50. This surface is intersected intermediate its axial length by the recess 42, and annular recesses 52 are provided in the surface 50 on each side of the recess 42 for receiving sealing rings. The body 22 is also provided with threads 54 adjacent the end thereof for receiving a nut 56.

A port collar 58, of annular configuration, having an internal cylindrical bore 60 of a diameter slightly greater than the diameter of the surface 50 is rotatably mounted upon the surface 50. The collar 58 is of such width as to engage the sealing rings within the recesses 52 and bridges the recess 42. The port 62 radially extends through the collar and is in communication with the recess 42 at bore 63. Port collar 58 is also provided with lateral, radial extending side edges 64 and 66 which are engaged by the ring 32 and nut 56, respectively. Therefore, it will be appreciated that upon unloosening the nut 56, e.g., backing the nut away from the collar 58, the collar 58 may be angularly related to the body 22 at any desired position as the collar is rotatably mounted on the surface 50. After the collar is positioned on the body 22 to place the port 62 in the desired angular relationship with respect to the body and cylinder 10, tightening of the nut 56 will compress the collar between the ring 32 and nut, and thereby lock the collar with respect to the other motor components. As the openings 40 communicate with the recess 42, it will be appreciated that regardless of the angular relationship of the collar 58 to the body 22, a fluid flow path exists between the chamber 24 and the port 62. It will also be appreciated that it is not necessary to employ a plurality of openings 40, in that only one is necessary for the practice of the invention. The use of a plurality of openings increases the cross-sectional area of flow path from the chamber 24 to the port.

Head 16 differs from head 14 in that the body 22' is provided with a cylindrical bore 68 which is concentric with the chamber 24'. Packing 70 is located within the bore 68 providing a sliding seal between the bore and the piston rod 22. A gland 72 of annular configuration surrounds the piston rod and is provided with a lip which extends into the bore 68 to compress the packing. Screws 74 may be employed to attach the gland to the body 22.

It will be appreciated that the above described structure permits an infinite number of angular relationships of the port 62 to the remaining motor structure. In the modification of FIG. 2 the basic inventive concept is the same as that described in conjunction with the structure of FIG. 1. However, in this embodiment the annular recess 42" is located within the collar 58", rather than the head 22" itself. In the embodiment of FIG. 2 the opening or openings 40" directly intersect the cylindrical surface 50" of the body 22", and the annular flow path is thus provided in the collar. The port 62" communicates with the recess 42" so that fluid communication between the chamber 24" and recess will be maintained at all angular positions of the collar upon the head.

It will be understood that various modifications to the invention may be apparent to those skilled in the art without departing from the spirit and scope thereof, and it is intended that the invention be defined only by the scope of the following claims.

I claim:
1. An expansible motor comprising, in combination, a cylinder having an open end, a head sealingly affixed to and enclosing said cylinder open end, fixed abutment means defined on said head abuttingly engaging said cylinder and axially positioning said head with respect to said cylinder in a predetermined relationship, a cylindrical surface exteriorly defined on said head and concentric to said cylinder, a collar having an inner cylindrical surface rotatably mounted upon said head cylindrical surface in a close fitting relationship, an annular recess defined intermediate said head and collar within the axial length of the cylindrical surfaces thereof, a port defined in said collar in communication with said recess, an opening defined in said head establishing communication between said recess and the interior of said cylinder, and means angularly locking said collar with respect to said head.

2. In an expansible motor as in claim 1, wherein said recess is formed by an annular groove defined in said head and intersecting said cylindrical surface of said head.

3. An expansible motor comprising, in combination, a cylinder having an open end, a head sealingly affixed to and enclosing said cylinder open end, fixed abutment means defined on said head abuttingly engaging said cylinder and axially positioning said head with respect to said cylinder in a predetermined relationship, an axially extending chamber defined within said head in communication with the interior of said cylinder and concentric thereto, a cylindrical surface defined on the exterior of said head, an annular collar having an inner cylindrical surface rotatably mounted on said head cylindrical surface in a close fitting relationship, an annular recess defined intermediate said head and collar within the axial length of the cylindrical surfaces thereof, a port defined in said collar in communication with said recess, an opening defined within said head interconnecting said recess and chamber and locking means angularly locking said collar with respect to said head.

4. In an expansible motor as in claim 3, wherein said recess comprises an annular groove defined within said head and intersecting the cylindrical surface thereof, and a plurality of openings defined in said head interconnecting said groove and said chamber.

5. A head for an expansible motor comprising, in combination, a body member having first and second ends and a longitudinal axis, cylinder mounting means mounted upon said body member, fixed cylinder abutment means defined on said body member adjacent said first end and transversely disposed to said longitudinal axis, a chamber defined in said body member, a cylindrical surface defined on said body member intermediate said first and second ends and concentric to said axis, an annular collar having an inner cylindrical surface closely received upon said body member cylindrical surface for rotatable movement thereon, a recess defined between said collar and body member within the axial length of said cylindrical surfaces, collar locating means mounted on said body member between said collar and said first end restraining said collar against axial movement toward said body member first end, a port defined in said collar communicating with said recess, a passage defined in said body member establishing communication between said recess and said chamber, threads defined on said body member adjacent said second end and concentric to said longitudinal axis, and a nut mounted upon said threads adapted to force said collar against said locating means to angularly lock said collar relative to said body member.

References Cited by the Examiner
UNITED STATES PATENTS 2,459,643   1/49   Hartley _____ 285—190
2,480,633   8/49   Christensen _____ 92—164

FRED E. ENGELTHALER, *Primary Examiner.*